Dec. 20, 1927.
H. S. HART
1,653,277
AUTOMOBILE BRAKE MECHANISM
Filed July 12, 1926    2 Sheets-Sheet 1
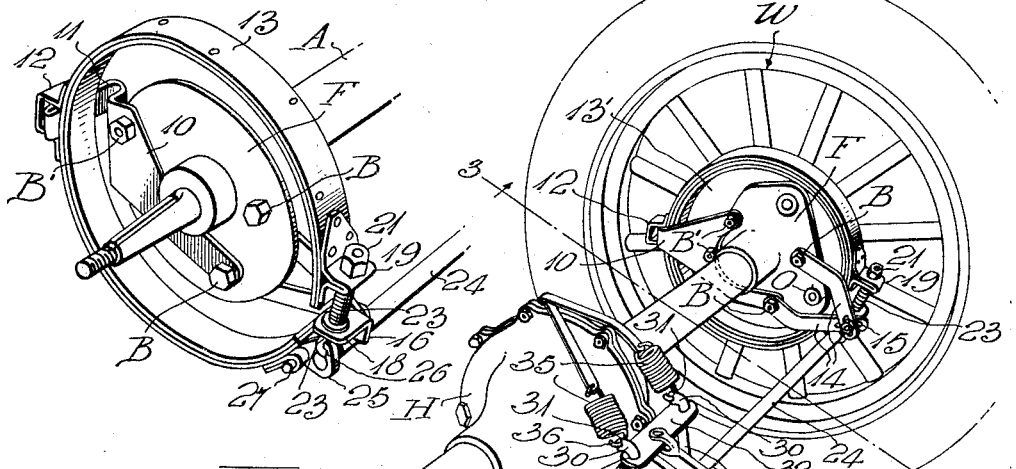
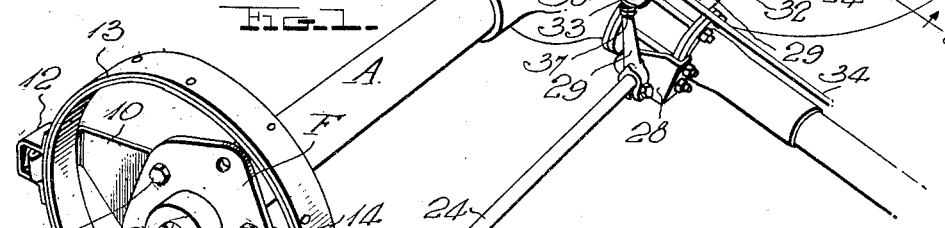
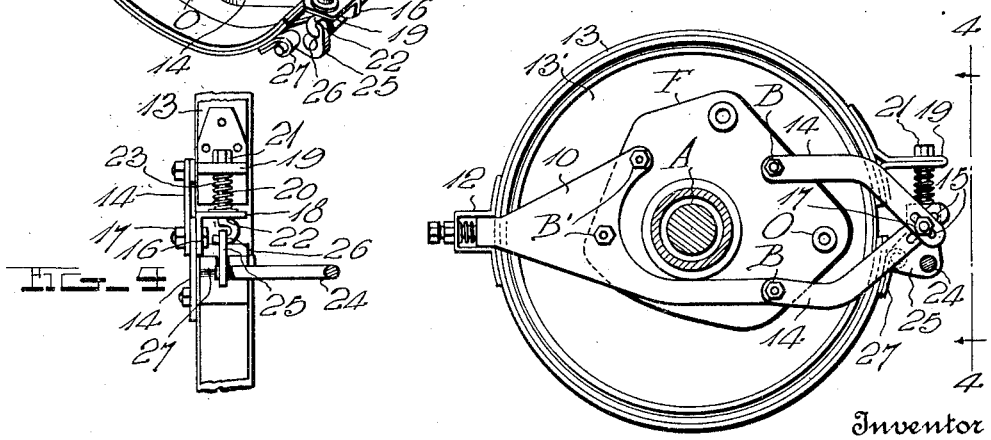
Witness
H. Woodard
Inventor
H. S. Hart
By H. B. Wilson &co
Attorneys Dec. 20, 1927.
H. S. HART
1,653,277
AUTOMOBILE BRAKE MECHANISM
Filed July 12, 1926
2 Sheets-Sheet 2
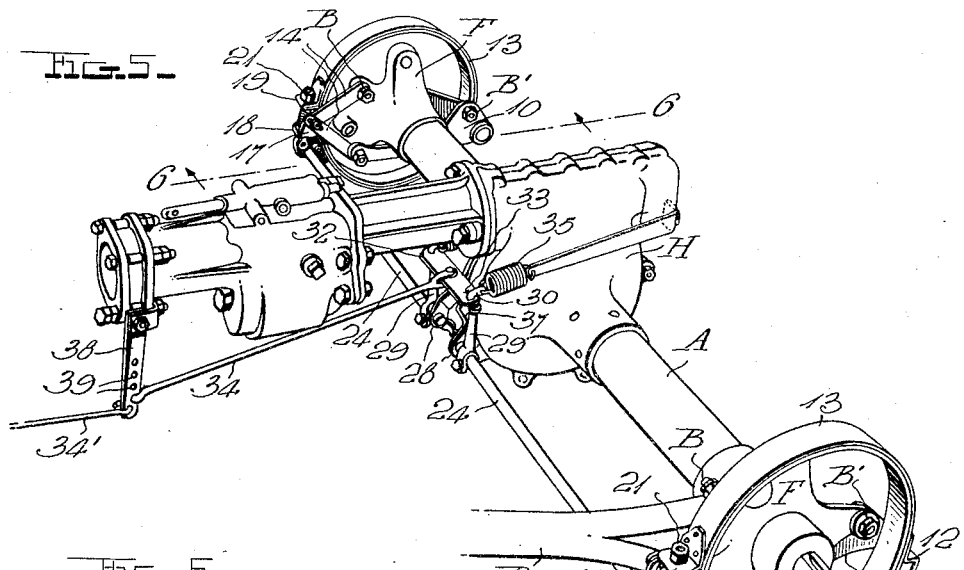
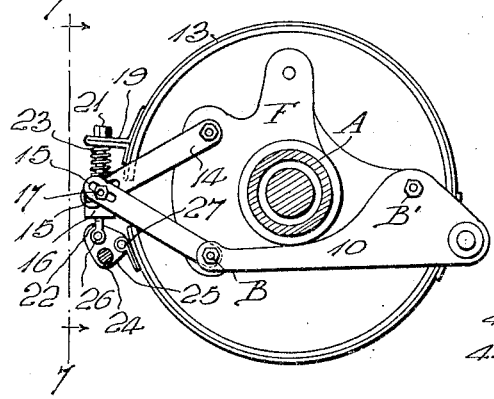
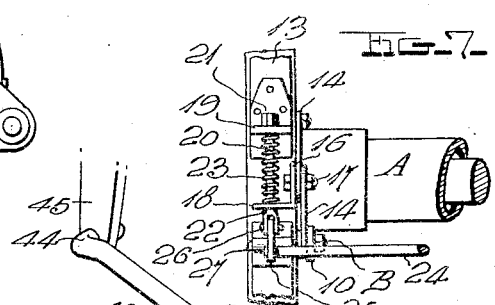
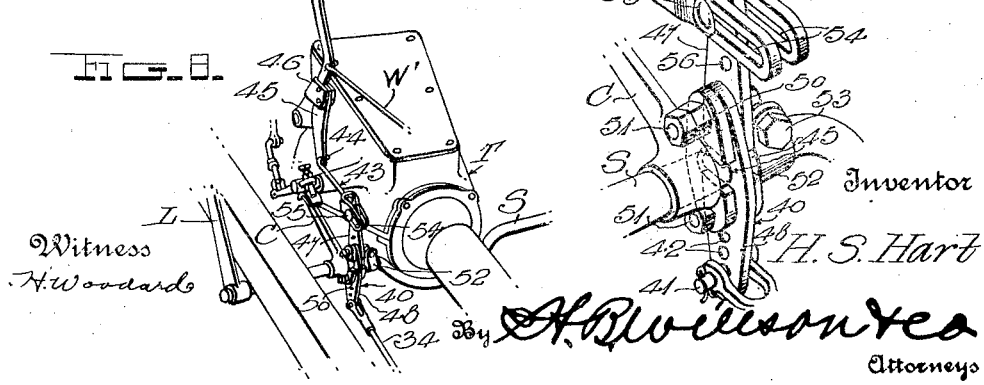
Inventor
H. S. Hart
Witness
H. Woodard
By H. B. Wilson & Co.
Attorneys Patented Dec. 20, 1927.

1,653,277

UNITED STATES PATENT OFFICE.

HERBERT S. HART, OF SAN ANTONIO, TEXAS.

AUTOMOBILE BRAKE MECHANISM.

Application filed July 12, 1926. Serial No. 121,968.

The invention relates primarily to a new and improved brake mechanism adapted for use on a well known form of passenger machine or truck in place of the usual cast iron brake shoes of the hub brakes and the brake band of the transmission brake.

It is one object of the invention to provide a new and improved construction and arrangement of parts which may be quickly and easily installed and will be highly efficient in operation, provision being made whereby the braking action is effected by contractible brake bands and drums of ample size.

In carrying out the above end, further objects are to make unique provision whereby the brake bands may be so adjusted with respect to the drums as to give the best results.

With the foregoing in view, the invention resides in the novel subject matter hereinafter described and claimed, the description being supplemented by the accompanying drawings.

Figure 1 is a perspective view showing the rear portion of the brake mechanism applied to the rear axle and associated parts of a passenger vehicle, of a late design.

Figure 2 is a detail perspective view illustrating the manner of applying certain parts upon older models of the same make of machine.

Figure 3 is a sectional view on line 3—3 of Fig. 1.

Figure 4 is a detail edge view as indicated by line 4—4 of Fig. 3.

Figure 5 is a perspective view similar to Fig. 1 but showing the arrangement used upon a truck rather than a passenger vehicle.

Figure 6 is a sectional view on line 6—6 of Fig. 5.

Figure 7 is a detail edge view as indicated by line 7—7 of Fig. 6.

Figure 8 is a small perspective view showing the relation of parts associated with the usual transverse controller shaft, the hand lever thereof, and the foot brake pedal.

Figure 9 is an enlarged perspective view of parts seen in Fig. 8.

The character A designates the rear axle of an automobile, the ends of said axle having outstanding flanges F, to which the rear radius rods R are connected by bolts B. These flanges also carry the rear spring perches (not shown) and ordinarily, rock shafts for operating the rear brake shoes, pass through the openings O of said flanges. Due to the nature of my invention, however, these rock shafts are eliminated and similarly, the cast iron brake shoes are not used. Certain openings through the flanges F, commonly receiving fastening means for portions of the rear hub brakes, I utilize to receive bolts B'. These bolts and the lowermost of the bolts B are employed to secure plates 10 to the flanges F, said plates projecting rearwardly from said flanges and having lateral portions 11 which are receivable in saddles 12 on brake bands 13, any desired adjustable connections such as those commonly used, being employed between said saddles 12 and the lateral portions 11 of the plates 10, permitting the rear portions of the brake bands to be adjusted to the desired extent toward the brake drums. These drums are indicated at 13', and they are secured to the rear wheels W in any desired manner.

In addition to performing the functions above described, I utilize the bolts B for securing the rear ends of upper and lower, forwardly converging arms 14, to the flanges F. The front ends of these arms overlap each other and are formed with registering slots 15. Vertical plates 16 are anchored to the slotted ends of the arms 14, by clamping bolts 17 which pass through said plates and through the slots 15. The lower ends of the plates 16 are formed with laterally projecting lugs 18 which are disposed under lugs 19 on the upper ends of the brake bands 13. Bolts 20 pass through alined openings in the lugs 18 and 19 and have adjusting nuts 21 threaded on their upper ends, the lower ends of said bolts being provided with appropriate shoulders 22 which are disposed under the lugs 18. Coiled, compression springs 23, surround the bolts 20 between the lugs 18 and 19, said springs acting upwardly against said lugs 19 to normally raise the upper portions of the brake bands 13 from the drums 13', and the upward movement of the bolts 20, lugs 19 and said upper portions of the bands 13 is limited by engagement of the shoulders 22 with the lugs 18.

Two, transversely alined, rock shafts 24 are provided in front of the axle A, the outer ends of these shafts being provided with appropriate heads 25 to which the lower ends of the bolts 20 and the lower ends of the brake bands 13 are pivoted, as indicated at 26 and 27 respectively.

It will be seen from the above that when the brakes are released, engagement of the shoulders 22 with the lugs 18, limits the inward movement of the brake bands, that is the lower portions thereof, toward the brake drums. Adjustment however of these lower portions is necessary as wear takes place, and when any such adjustment is required, the bolts 17 may be loosened. Then, the plates 16 and their lugs 18 may be readily adjusted to any desired extent, as occasion may dictate, some pivotal movement of the arms 14 about the bolts B, being then necessary. When the proper adjustments are made, tightening of the bolts 17 will lock the parts in adjusted position. Adjustment of the upper ends of the brake bands toward the drums, is controlled by means of the nuts 21, in the usual way.

Suitable supports 28 are provided for the inner ends of the shafts 24, said supports being bolted to the differential housing H or to some adjacent part, by bolts already found thereon. These inner ends of the shafts 24 are provided with upstanding arms 29 having hooks 30 at their upper ends, the bills of these hooks being rearwardly directed and having openings 31. A transverse equalizer 32 is formed with openings 33 rather loosely receiving the hooks 30, and a brake rod 34 extends forwardly from the center of this equalizer. Spring devices 35 of any desired form and anchored to the machine in any adequate manner, are provided to normally pull the equalizer 32 and the arms 29 rearwardly, assisting in holding the brakes in expanded condition and also preventing rattling. These devices 35 have hooks 36 which are hooked into the openings 31, so that said devices are not only effectively connected with the arms 29 but serve to prevent possible, accidental upward movement of the equalizer 32 from the hooks 30. To hold said equalizer against downward shaking upon the arms 29, the latter are preferably provided with stops 37 underlying said equalizer.

The rods 34 may lead directly forward to controlling means yet to be described, or may be connected with a leverage-changing arm 38, as shown in Fig. 5, said arm being suitably pivoted upon a known part of the machine and having openings 39 for adjustment of said rod. Another rod 34' is pivoted to and extends forwardly from the lower end of the arm 38 to the means just alluded to.

The controlling means for the rod 34 or 34', as occasion may be, is illustrated in Figs. 8 and 9. Well known portions of the machine, either truck or passenger vehicle, are illustrated. T designates the transmission, P has reference to the usual brake pedal which customarily operates a brake within the transmission casing, S designates the usual controller shaft having the hand brake lever L, and C indicates the arm on the shaft S which is instrumental in throwing out the clutch, when the lever L is pulled rearwardly.

The pedal P does not operate a transmission brake when my invention is installed in the preferred manner, as the transmission brake band is then removed. If desired, however, it will be understood that this band could be left in place and allowed to function.

The shaft S is usually instrumental in applying the ordinary hub brakes to the rear wheels, but as said hub brakes are omitted, this shaft is instrumental only in effecting contraction of the brake bands 13 and in throwing out the clutch when the machine is to stand idle.

A brake-applying member 40 is pivotally mounted upon the shaft S and has its lower end pivoted at 41 to the front end of the rod 34 or 34', openings 42 being provided for adjustment. The upper end of this member 40 is slidably connected with the rear end of a link 43, the front end of this link being pivoted at 44 to an extension arm 45, the latter being suitably secured at 46 to the brake pedal P and projecting downwardly below the pivot of said pedal. The sliding connection between the link 43 and the member 40, is such that upon forward movement of the pedal P, said member 40 will be rocked in a direction to pull upon the rod 34 or 34' for the purpose of applying the brakes. Provision is made however whereby the member 40 may be moved in brake-applying direction by turning of the shaft S, so that the brakes may be set simultaneously with throwing the clutch out when the machine is to stand. Then, the above-named sliding connection functions to permit the necessary movement of the member 40 without moving the pedal P in brake-applying direction. This is of particular advantage when this pedal is connected, for instance, by the usual wire W', with a switch for operating a stop light.

In the preferred construction, herein disclosed, the member 40 includes upper and lower sections 47 and 48, both notched to receive the shaft S, as indicated at 49. A notched plate 50 is also preferably included in the formation of said member 40 and prevents any canting of said member upon the shaft. The sections 47 and 48 and the plate 50 are secured together by appropriate bolts 51, and the uppermost of these bolts is disposed in the rearward path of the arm C. Thus, when lever L is operated to turn the shaft S in a direction to throw out the clutch, the arm C strikes said upper bolt 51 and thus turns the member 40 in brake-applying direction. When the parts are in normal running position, the arm C is in advance of the upper bolt 51 and depression of the brake pedal P to apply the brakes, moves the member 40 in such a direction as to cause said upper bolt 51 to move rearwardly away from the arm C. Thus, it will be seen that the lever L may be utilized to apply the brakes and throw out the clutch without affecting the foot pedal P. Similarly, this foot pedal may be employed to apply the brakes without effecting any movement of the shaft S.

The member 40 may be held in proper relation with the arm C by any desired means. For this purpose, I prefer to employ a collar 52 clamped upon the shaft S by a bolt 53. This collar and the sections of the member 40 may be readily applied to the shaft S without the necessity of dismounting the latter.

The slidable connection above referred to, between the link 43 and the upper end of the member 40, preferably comprises two longitudinally slotted arms 54 at the rear end of the link, and a bolt or the like 55 passing through said slots and through the upper end of the member 40. A series of openings 56 may be formed in this member 40 for purpose of adjustment if desired, and adjusting nuts 57 may also be employed to permit longitudinal adjustability of the link 43.

It will be seen from the foregoing that rather simple, easily applied and efficient brake mechanism has been provided, for the purposes intended, and while the details herein disclosed have proven effective in actual use, it is to be understood that within the scope of the invention as claimed, variations may be made.

I claim:—

In an automobile brake mechanism, upper and lower arms converging forwardly and having their front ends overlapped and formed with registering slots, the rear ends of said arms being formed with openings to receive attaching fasteners, a vertical plate contacting with one of said front ends, a bolt passing through said plate and through said slots, said bolt normally securing said plate to said arms and when loosened permitting vertical adjustment of the plate, a lug projecting laterally from the plate and having an opening, a brake band having a lug at one end spaced above the first named lug and also formed with an opening, a band-adjusting bolt passing through said lug openings and having a shoulder under the first named lug, a band-contracting member connecting the lower end of said bolt with the lower end of the brake band, an adjusting nut on the upper end of the bolt resting upon the lug of the brake band, and a band-expanding spring surrounding the bolt between the two lugs, said spring thrusting upwardly on the bolt to normally hold its shoulder against the lower side of said first named lug, whereby vertical adjustment of the aforesaid plate and its lug will effect vertical adjustment of the bolt, the band-contracting member and the lower portion of the band, adjustment of the upper portion of the band being effected by means of the aforesaid nut.

In testimony whereof I have hereunto affixed my signature.

HERBERT S. HART.